(12) United States Patent
Oserod

(10) Patent No.: US 7,445,708 B2
(45) Date of Patent: Nov. 4, 2008

(54) PLANT FOR PURIFYING WATER CONTAMINATED BY DROPLETS OF HYDROCARBONACEOUS LIQUID

(75) Inventor: Stein Egil Oserod, Kingscliff (AU)

(73) Assignee: M-I Epcon AS, Porsgrunn (NO)

( * ) Notice: Subject to any disclaimer, the term of this patent is extended or adjusted under 35 U.S.C. 154(b) by 983 days.

(21) Appl. No.: 10/343,824

(22) PCT Filed: Aug. 7, 2001

(86) PCT No.: PCT/IB01/01410

§ 371 (c)(1),
(2), (4) Date: Aug. 18, 2003

(87) PCT Pub. No.: WO02/12128

PCT Pub. Date: Feb. 14, 2002

(65) Prior Publication Data

US 2007/0221558 A1    Sep. 27, 2007

(30) Foreign Application Priority Data

Aug. 8, 2000    (EP)    ............................. 00610080

(51) Int. Cl.
*B01D 17/035*    (2006.01)
*C02F 1/24*    (2006.01)
*C02F 9/02*    (2006.01)

(52) U.S. Cl. .................... 210/221.2; 210/799; 210/295; 210/209; 210/218

(58) Field of Classification Search ............... 210/221.2, 210/295, 209, 218, 221.1, 799
See application file for complete search history.

(56) References Cited

U.S. PATENT DOCUMENTS

| 4,094,783 A | * | 6/1978 | Jackson | ....................... 210/703 |
| 4,178,245 A | * | 12/1979 | Nakaoka et al. | ............. 210/791 |
| 4,282,097 A | * | 8/1981 | Kuepper et al. | ............. 210/200 |
| 4,839,040 A | | 6/1989 | Alm | |
| 5,591,347 A | | 1/1997 | Cairo et al. | |
| 6,450,344 B1 | * | 9/2002 | Kitano et al. | ................ 209/170 |

FOREIGN PATENT DOCUMENTS

| DE | 3924658 | * | 1/1991 |
| JP | 53-091462 | * | 1/1977 |
| WO | WO99/35093 | | 7/1999 |
| WO | 00/12220 | * | 3/2000 |

* cited by examiner

*Primary Examiner*—Thomas M Lithgow
(74) *Attorney, Agent, or Firm*—Jacobson Holman PLLC

(57) ABSTRACT

A unit for purifying water contaminated by droplets of hydrocarbonaceous liquid has an essentially vertically positioned filter, an inlet chamber for the contaminated water that is partially defined by a first vertical surface of the filter, supply means for contaminated water debouching in the lower portion of the inlet chamber, and outlet means connected to the upper portion of the inlet chamber for discharging hydrocarbonaceous liquid separated from the water in the inlet chamber. The operational period between filter cleaning and/or the hourly capacity of the filter is increased by injecting fine gas bubbles into the contaminated water in least one location selected from locations in the lower portion of the inlet chamber and locations in the supply means to produce a stream of gas bubbles upwards along the first vertical filter surface.

20 Claims, 1 Drawing Sheet

PLANT FOR PURIFYING WATER CONTAMINATED BY DROPLETS OF HYDROCARBONACEOUS LIQUID

This is a nationalization of PCT/IB01/01410 filed Aug. 7, 2001 and published in English.

FIELD OF THE INVENTION

The present invention relates to the decontamination of waste water containing hydrocarbonaceous liquid and possibly other liquid or particulate contaminations.

The invention is applicable within a broad range of industries comprising the petroleum industry, including oil exploitation and production, especially offshore, refining, transport, storage, tank cleaning etc., environmental restoration, or purification of industrial cooling water, etc.

BACKGROUND OF THE INVENTION

Conventionally, cleaning of oil contaminated industrial waste water is performed by passing the waste water through separation ponds in which the oil rises to the surface and is removed partially by sweeping. This process may be combined with a flotation, in which air is dispersed into the water and promotes the separation of oil droplets and collection thereof at the water surface.

This treatment may be followed by passage of the partially cleaned water through a sandfilter or filter elements.

When it is necessary to remove not only emulsified or suspended contaminations but also such which are dissolved in the aqueous phase a subsequent filtration through a filter comprising activated carbon is conventional.

For purification of only moderately oil-contaminated water it has been suggested to filter through a porous polymer material, pre-impregnated with an absorption liquid. However, this method is not suited as the sole treatment of more heavily polluted water.

In e.g. U.S. Pat No. 5,591,347 (Cairo, Jr. et al.), an apparatus is disclosed in which a fluidization is performed in the upper portion of a vessel whereas a filtration takes place in the lower part of the same vessel.

Although the last-mentioned type of apparatuses represents certain improvements, especially reduced space requirements in comparison to equipments having distinct flotation and filtration devices, the purification efficiency is inferior to the one desired to fulfil the environmental standards of today.

A different concept is used in the filter apparatus disclosed in U.S. Pat. No. 4,839,040 (Alm). Said apparatus has a vertical annular filter chamber enclosing a particulate, elastic, oil absorbing, regeneratable filter material. The efficient use of such a filter material is enabled by axially moveable annular transverse walls for continously compressing the filter material. The vertical outer walls of the annular filter chamber are encircled by a jacket which receives the contaminated water through an inlet in the lower portion of the jacket. While present in said jacket during its passage towards the filter surface, a partial gravitational separation of the oil/water phases takes place, meaning that a part of the oil phase reaches the top portion of said jacket from where it is removed. Thereby, that part of the oil phase does not reach the filter and a corresponding prolongation of the operating periods between filter cleaning operations is achieved.

With a proper filter material, the last-mentioned type of filter apparatus provides a very efficient cleaning. Not only droplets of oil or fatty liquids and particles, even of sub-micron size, are removed but also lipophillic pollutants dissolved in the aqueous phase can be removed. The apparatus has also other advantages, including high capacity and moderate space requirements.

Cleaning of the filter is necessitated either when the amount of pollutants in the effluent water exceeds a fixed value or when the pressure drop over the filter becomes too high. Said cleaning is made by back-flush using a hot fluid.

Often the amount of oil droplets and saturated vapour bubbles which settles on the outer filter surface is important as to the duration of the operational periods between each back-flush operation.

In spite of the fact that each back-flush operation only lasts a few minutes, it is desired to increase the length of each operational period by minimizing the amount of oil droplets, vapour bubbles, and particles penetrating into the filter surface. This is according to the invention achieved by applying a special measure to separate a proportion as large as possible of the oil phase from the contaminated water before the latter reaches the filter surface and also to loosen oil droplets and vapour bubbles from the filter surface to avoid their penetration into the filter material and blocking thereof.

SUMMARY OF THE INVENTION

It has turned out that the above described disadvantages of having oil droplets and vapour bubbles settling on the upstream filter surface may be reduced by designing the filter plant as defined below.

Thus, the invention deals with a plant for purifying water contaminated by droplets of hydrocarbonaceous liquid, comprising an essentially vertically positioned filter; an inlet chamber for said contaminated water partially defined by a first vertical surface of said filter; an outlet chamber for filtrated water partially defined by a second surface of said filter opposite to said first surface relative to the filter; supply means for the contaminated water debauching in the lower portion of said inlet chamber; outlet means connected to the upper portion of said inlet chamber for discharging hydrocarbonaceous liquid separated from the water in said inlet chamber; and duct means for recovering purified water from said outlet chamber; which plant according to the invention is characterized in having means for injecting gas, e.g. air, as fine bubbles into the contaminated water at least at one location selected from locations in the lower portion of said inlet chamber and locations in said supply means, to produce a stream of gas bubbles upwards along said first vertical filter surface for release and upward removal of droplets of hydrocarbonaceous liquid and vapour bubbles settled on the filter surface and to entrain and remove upwards such droplets and vapour bubbles being in the process of settling on the filter surface, thereby delaying blocking of the filter surface and promoting a merging of said droplets to form a continous hydrocarbonaceous phase in said upper portion of the inlet chamber.

Important embodiments of the plant according to the invention are specified in the sub-claims attached hereto.

In the following, the invention is explained in more details with reference to the drawings.

Figure 1:
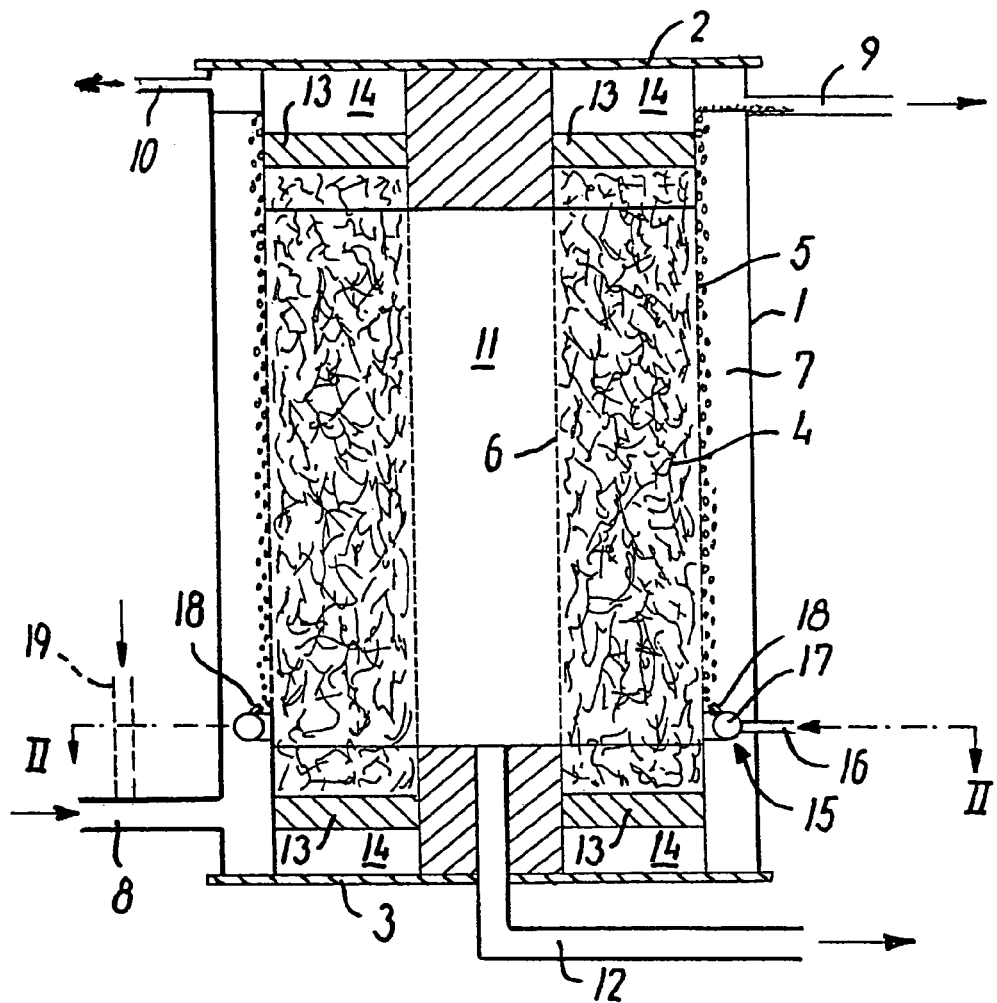
FIG. 1 is a diagramatical, vertical section through an embodiment of a plant according to the invention.
Figure 2:
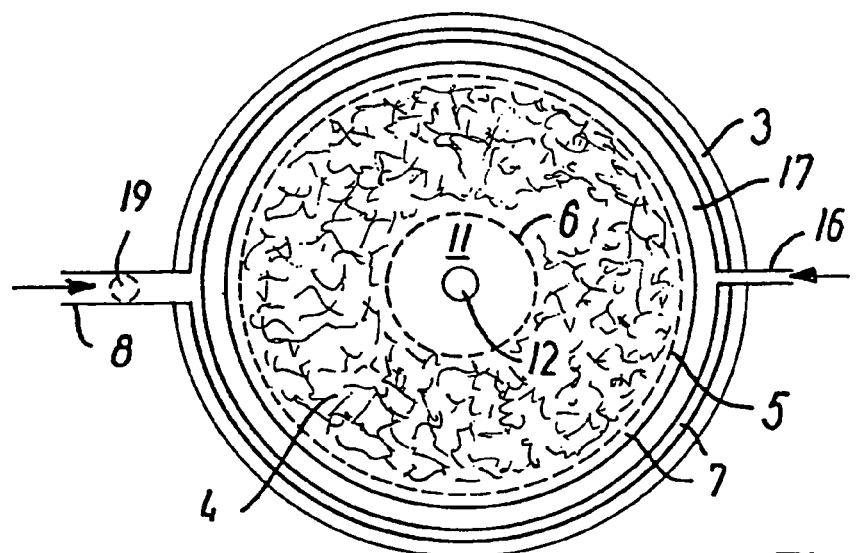
FIG. 2 is a diagramatical, horizontal section through the plant according to FIG. 1 along the dotted line II-II.

The embodiment of the plant depicted in the figures comprises an outer pressure-resistant housing formed by a cylindrical vertical wall 1 and detachable lid and bottom members 2 and 3, resp.

In said housing is a vertically positioned filter 4, preferably of a granular filter material, enclosed between a first vertical liquid-pervious surface 5 and a second liquid-pervious filter surface 6.

The surfaces 5 and 6 are e.g. metal sheets or similar constructions having perforations, slots or other openings permitting the passage of liquid but retaining the material forming the filter 4. Typically, the smallest dimensions of said openings will be of the magnitude 15 μm to 1 mm, preferably from 15 to 50 μm.

The wall 1 and said first filter surface 5 define a jacket which constitutes an inlet chamber 7 for the contaminated water to be cleaned.

Said inlet chamber 7 is provided with an inlet duct 8 for contaminated water and an outlet duct 9 for oil and froth formed in the operation of the plant as explained below. The inlet chamber preferably also has an outlet conduit 10 for withdrawing gas from the top portion of the chamber.

Said second filter surface 6 encircles an outlet chamber 11 connected to an outlet duct 12.

The end portions of the walls forming said first filter surface 5 and said second filter surface 6 are impervious and between these impervious parts are in each end an axially moveable annular transverse wall 13 for compressing the filter material under the influence of a pressure medium supplied (by means not shown) to annular chambers 14.

As to further constructional and operational details concerning the transverse walls 13 and their function, reference is made to the above-mentioned U.S. Pat. No. 4,839,040 (Alm) incorporated herein by reference.

As an important feature of the invention, means 15 for injecting a gas such as air is provided in the lower portion of the inlet chamber 7.

In the depicted embodiment, said means 15 comprises an inlet duct 16 connecting a source (not shown) of pressurized gas, e.g. air, to a circular pipe 17 provided with evenly spaced nozzles 18 for gas injection.

Several other designs of the gas injection means 15 are possible. Thus, the circular pipe 17 may be placed outside the chamber 7 with nozzles penetrating the wall 1 (not shown).

The means 15 may be replaced by or supplemented by means 19 (shown in dotted lines) for injecting gas into the contaminated water when passing into the chamber 7 through the inlet duct 8.

Whichever means are used for gas injection, it is essential that an upward flow of tiny gas bubbles is created along at least a substantial portion of the pervious part of the wall forming the filter surface (5), as schematically indicated in FIG. 1.

When operating the plant, the water to be decontaminated is introduced through inlet duct (8).

Typically, this contaminated water, originating e.g. from one of the industries defined above, is salt water or sweet water containing droplets of hydrocarbons and possibly also fine solid particles and dissolved hydrocarbons and chemicals. Furthermore, very small and thus difficult to separate bubbles of saturated vapour may be present or may occur during the handling.

Having entered the circular inlet chamber (7), the contaminated water and especially oil droplets therein initiate and upward movement.

To reduce the amount of oil and other not dissolved pollutants reaching the filter it is important that a substantial part of the contaminations is separated from the water during the passage through the inlet chamber (7). The oil phase, possibly also containing chemicals, which thus collects on the surface of the liquid in the chamber (7) is recovered by continuous or intermittent suction through outlet (9), partially as foam together with some water. This eliminates the risk that said oil and chemicals are carried into the filter or block the openings of the surface 5. The thus recovered mixture of oil and water is separated using conventional means (not shown) and the aqueous phase is recycled for re-introduction through inlet duct (8).

The separation of the oil phase from the water in the chamber (7) is promoted by the gas bubbles, in the shown embodiment injected through the nozzles (18), to obtain i.a. the effect known per se from conventional flotation processes.

In the depicted embodiment, the gas after having thus served as floatation gas is removed through the outlet conduit (10) but, alternatively, the gas may be withdrawn together with oil, foam, and float through the outlet (9).

In the bottom portion of the chamber (7) means (not shown) may be provided for continuous or intermittent withdrawal of silt and sludge collected in said bottom portion, thereby avoiding that said silt and sludge reach the surface (5).

During the upward passage of the contaminated water through the chamber (7), a portion thereof moves centrally towards said first pervious surface (5) which performs an initial filtering or sieving function holding back relative large droplets and particles, whereas finer contaminations and dissolved contaminations are entrained with the water into the very filter (4) in which these contaminants are efficiently adsorbed or absorbed (for simplicity in the following just termed "sorbed").

The thus decontaminated flow of water through the filter reaches said second surface (6) of a perforated or otherwise pervious material, through which it enters the outlet chamber (11) from where it is withdrawn through duct (12).

Oil droplets, solid particles, and bubbles which settle on said first surface (5) may, especially in conventional filters without flotation or wherein the flotation step and the filtration step are not intimately combined as in the present invention impede the proper function of the filter, and in connection with certain contaminants this may be a feature determining the length of uninterrupted operation between backflush or renewal of the filter.

Therefore, the "sweeping" of the filter surface (5) by means of the rising flows of bubbles, which promotes an upward flow of contaminant droplets and particles ensures not only a larger proportion of said contaminants reaching the liquid surface for removal through outlet (9) without contacting the filter surface (5) but also to a certain extent loosens droplets, particles, and bubbles settled on the surface before they form a coherent, partially impervious coating on the filter surface. Thus, the application of the gas bubbles exerts a double effect increasing the length of effective filter operation.

As depicted, the gas injection may take place through nozzles (18), however, instead of proper nozzles the gas injection may be performed using means of sintered glass or other means conventional for producing relative small bubbles.

By creating conditions typical for a flotation process in the inlet chamber (7), and especially in the vicinity of the filter surface (5), in the plant according to the invention, it is possible to increase the ratio of the amount of oily substances recovered from the top of the inlet chamber through (9) to the amount of oily substances sorbed by the filter, meaning that the first-mentioned amount may be substantially more than one thousand fold of the second amount.

When treating waste water from the oil exploration and production industry, the separation of oily substances from the aqueous, adjuvants-containing phase may often be facilitated by decreasing the pH value. In the plant according to the invention, this can conveniently be done by injecting carbondioxide through the same means (16, 17, 18 or 19) as used for introduction of the flotation gas, which is typically atmospheric air. The carbondioxide dissolves spontaneously in the waste water and this decreases the pH value and thereby reduces the emulsifying effect of surfactants mainly active at basic or neutral pH values. Also flocculation promoting adjuants may be added, for instance through (19).

In the practical embodiment of the invention, several modifications of the depicted plant can be made. Thus, it might be preferred to have an outlet duct for filtrated water corresponding to (12) also in the upper portion of the filter unit. Also, in practice it will be suitable to have the lid and bottom members (2 and 3) formed as vaulted end pieces to obtain a more pressure-resistant design.

As explained above, the present invention enables an increased operational period between each cleaning of the filter by backwash. The length of this operational period is of course influenced by several features, among which are the composition of the waste water and the load on the filter, viz. the amount of liquid passed through each square metre of the filter.

Several tests have substantiated that with the filter according to the invention, long operational periods, for instance of 24 h each, can be maintained while the filter is loaded with more than 100 $m^3/h/m^2$ polluted water which is cleaned to well below 5 mg oil/liter.

To the best knowledge of the inventor, this high capacity together with the very compact design causes the plant according to the invention, from a capacity/space requirement view, to be superior to any hitherto marketed or suggested device for similar purposes.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A unit for purifying water contaminated by droplets of hydrocarbonaceous liquid and other pollutants, comprising:
    an essentially vertically positioned filter;
    an inlet chamber for said contaminated water partially defined by a first vertical surface of said filter;
    an outlet chamber for filtrated water partially defined by a second surface of said filter opposite to said first surface relative to the filter;
    supply means for contaminated water debouching in a lower portion of said inlet chamber;
    outlet means connected to an upper portion of said inlet chamber for discharging hydrocarbonaceous liquid separated from the water in said inlet chamber;
    duct means for recovering purified water from said outlet chamber; and
    means for injecting gas as fine bubbles into the contaminated water in at least one location selected from locations in the lower portion of said inlet chamber and locations in said supply means, the means for injecting gas producing a stream of gas bubbles upwards along said first vertical filter surface to release and remove upwards droplets of hydrocarbonaceous liquid and vapour bubbles settled on the filter surface and to entrain and remove upwards such droplets and vapour bubbles otherwise prone to settle on the filter surface, thereby delaying blocking of the filter surface and promoting a merging of said droplets to form a continuous hydrocarbonaceous phase in said upper portion of the inlet chamber.

2. The unit according to claim 1, wherein the filter includes a particulate, elastic, oil-sorbing, regeneratable filter material enclosed between two liquid-pervious supporting sheets forming said first vertical surface and said second surface.

3. The unit according to claim 1, wherein said outlet chamber is shaped as a vertical, rotational symmetrical cylinder;
    said filter is coaxially surrounding said outlet chamber and has an annular, horizontal cross-section; and
    said inlet chamber forms a jacket around the filter and has an annular, horizontal cross-section.

4. The unit according to claim 1, wherein said means for injecting gas into the contaminated water is at least one nozzle inserted in the bottom portion of the inlet chamber and connected to a source of pressurized air.

5. The unit according to claim 4, wherein said at least one nozzle is a plurality of nozzles evenly spread at a horizontal level in the bottom portion of the inlet chamber to produce an even sweeping upward flow of bubbles through the water in the inlet chamber in the vicinity of the filter surface.

6. The unit according to claim 1, wherein said means for injecting gas into the contaminated water is at least one nozzle inserted in said supply means and connected to a source of pressurized air, said at least one nozzle being able to disperse air evenly into the contaminated water before the water reaches the bottom portion of the inlet chamber.

7. The unit according to claim 1, further comprising means for introducing a flotation promoting agent into the contaminated water in the supply means therefor or in the lower portion of said inlet chamber.

8. The unit according to claim 1, wherein said outlet means for hydrocarbonaceous liquid is configured to discharge gas from the upper portion of the inlet chamber.

9. The unit according to claim 1, further comprising separate discharge duct means for spent flotation gas in the upper portion of said inlet chamber.

10. The unit according to claim 1, further comprising means for introducing $CO_2$ into the contaminated water, said means for introducing $CO_2$ being the means for injecting gas as fine bubbles or being separate means for introducing $CO_2$ placed in the lower portion of the inlet chamber or in said supply means thereto.

11. The unit according to claim 1, wherein the liquid-pervious sheet forming said first vertical surface of the filter is of metal construction and has slot openings of a width of from 15 μm to 1 mm.

12. The unit according to claim 1, wherein the filter includes a filter material between the first filter surface and the second filter surface, the filter material being an organic polymer in granulated form having high compressibility.

13. The unit according to claim 11, wherein the width of the slot openings is from 15 μm to 50 μm.

14. An apparatus for purifying water contaminated by droplets of hydrocarbonaceous liquid, comprising:
    a substantially vertically oriented filter having a first vertical surface and an opposite second surface;
    a contaminated water inlet chamber partially defined by the first vertical surface;
    a filtrated water outlet chamber partially defined by the second surface;
    a supply conduit configured to debouch contaminated water in a lower portion of said inlet chamber;

an outlet conduit connected to an upper portion of said inlet chamber that discharges hydrocarbonaceous liquid separated from the water in said inlet chamber;

a duct that recovers purified water from said outlet chamber; and a conduit configured to inject a gas into the contaminated water and produce a stream of gas bubbles moving upward along at least a substantial portion of said first vertical surface so as to convey upward from the filter surface droplets of hydrocarbonaceous liquid and vapour bubbles.

15. The apparatus according to claim 14, wherein said gas injection conduit produces the stream of gas bubbles so as to delay blocking of the filter surface and promote a merging of said droplets to form a continuous hydrocarbonaceous phase in the upper portion of the inlet chamber.

16. The apparatus according to claim 14, wherein said gas injection conduit injects the gas in at least one location in the lower portion of the inlet chamber or in the supply conduit.

17. The apparatus according to claim 16, wherein said gas injection conduit is at least one nozzle inserted in the lower portion of the inlet chamber and connected to a source of pressurized air.

18. The apparatus according to claim 16, wherein said gas injection conduit is at least one nozzle inserted in said supply conduit and connected to a source of pressurized air, said at least one nozzle being configured to disperse air evenly into the contaminated water before the water reaches the lower portion of the inlet chamber.

19. The apparatus according to claim 14, wherein said gas injection conduit includes an inlet gas duct and a circular pipe having a plurality of evenly spaced nozzles through which the gas is injected.

20. The apparatus according to claim 14, further comprising a conduit configured to introduce $CO_2$ into the contaminated water.

* * * * *